Patented Sept. 13, 1927.

1,642,537

UNITED STATES PATENT OFFICE.

ELMER B. BROWN, OF NEW YORK, N. Y., ASSIGNOR TO THE FLEISCHMANN COMPANY, OF NEW YORK, N. Y., A CORPORATION OF OHIO.

PROCESS FOR IMPROVEMENT OF FLAVOR OF YEAST.

No Drawing. Application filed March 12, 1925. Serial No. 15,149.

This invention relates generally to yeast and to a method of treating the same to modify certain characteristics thereof, and has as a general object, the production of a product of high quality in a convenient and economical manner.

A more specific object of the invention is to provide a method adapted to produce an improved yeast product of suitably modified flavor, without deleteriously affecting its color, baking strength or keeping qualities.

Other objects of the invention will in part be obvious and will in part appear hereinafter.

The invention accordingly comprises the several steps and the relation and order of one or more of such steps with respect to each of the others, and the article possessing the features, properties, and the relation of elements, which are exemplified in the following detailed disclosure, and the scope of the application of which will be indicated in the claims.

The use of yeast in the manufacture of bread-stuffs and fermented beverages has long been known. Within recent years especially because of the therapeutic and medicinal properties, there has arisen an increased demand for yeast for alimentary purposes. The use of yeast in this manner has been somewhat limited on account of the natural taste of yeast being unpleasant to some persons.

It has heretofore been proposed to modify the flavor of yeast, particularly beer yeast, by treating the same in dilute sugar solutions in the presence of small amounts of acid or alkali, for the alleged purpose of removing therefrom the bitter constituents, which in the case of beer yeast were composed for the most part of hop resins. Such proposed treatments were not entirely successful, however, for the reason that in order to obtain the desired modification in flavor, it was necessary to subject the yeast to the influence of the dilute solution for such an extended time that the baking strength and keeping qualities thereof were deleteriously affected. Moreover, such extended treatment at the dilutions used, involve considerable loss of sugar, due to fermentation.

Under market conditions, it is obvious that it is commercially impracticable to market a compressed yeast which is adapted only for eating purposes, and that therefore, a compressed yeast suitable for both baking and eating purposes and which in fact has esculent characteristics is highly desirable. In the present invention, therefore, the desired modification of flavor is accomplished under such conditions of concentration, temperature and time control that the flavor of the yeast may be modified substantially or to the desired extent without appreciably impairing the keeping qualities or baking strength thereof and without accompanying loss of yeast or sugar by autolysis or fermentation.

In the carrying out of the improved process it is desirable to utilize a yeast having inherently good baking strength, and it has been found that the most generally suitable yeast for treatment is the ordinary compressed yeast manufactured for use in the household and bakery for making bread-stuffs.

The modification in flavor is accomplished by subjecting the yeast to the action of a suitable soluble substance (i. e., a solute), or a mixture of soluble substances, as for example, a sugar or sugar-containing substance such as cane sugar, glucose, maltose, cane sugar syrup, malt extract, molasses, etc., or a suitable salt, such as for example sodium chloride, potassium chloride or the like, in the presence of some moisture, as for example, the moisture ordinarily present in compressed yeast, whereby there occurs an exosmotic action resulting in a withdrawal of certain components of the yeast cells without rupture of the cell walls. The treatment is continued only so long as is necessary to accomplish the desired modification in flavor, and the conditions of temperature and concentration are maintained such that with any of the above substances, autolysis of the yeast is substantially prevented and that, when using a saccharine type of solute, fermentation losses are minimized.

In the practice of the present invention, it has been found that substantial modification of the flavor of yeast may be accomplished in from 1 to 48 hours, dependent upon the flavor desired, the materials used and the concentration and temperature conditions. In order that substantially no autolysis may occur, it is desirable not to allow the temperature of the mass during treatment to be in excess of about 30° C., and in order to prevent or minimize fermentation, it is desirable that the mixture should contain at least about 25% sugar by weight, although a larger proportion may be used if desired, and it has been found to be advantageous to use, in practice, about 33% or more.

After the treatment has been continued for a time sufficient to accomplish the desired modification of flavor, the excess of the solute is removed from the treated yeast. When the treatment has been accomplished with the use of either salts or sugar, removal of the excess thereof may be accomplished by repeatedly washing and separating or pressing off the yeast. In some cases, however, in which sugar has been used, it may be found desirable to ferment off the last traces thereof and this may be accomplished by washing, separating, diluting, and slowly aerating the mass until substantially all of the sugar remaining has been fermented, whereupon the mixture may be reseparated. In any event, the removal of the excess of solute should be carried on as rapidly as is possible in order to prevent impairment of the baking strength and keeping qualities of the yeast, and after the final separation, the excess of moisture may be pressed off and the yeast packaged in the usual manner.

As illustrative of the manner in which the invention may be practiced, the following examples are given:

Example I.

Taking any desired amount of compressed yeast (containing about 65% water), there is added thereto an equal amount by weight of sugar (or an equivalent amount of sugar-containing substance), and the mass is intimately mixed, whereupon it immediately becomes limpid, due to the ex-osmotic action of the sugar. The mixture is then allowed to stand at room temperature until the desired modification of flavor is obtained, as for example, about 8 hours, whereupon the yeast may be recovered by either of the following alternative methods: (a) The mixture is diluted with water (for example for about 1 gallon to each pound of yeast), mixed thoroughly, separated, again diluted with water in about the same proportions and slowly aerated until the sugar remaining therein is fermented out, (this step serving to strengthen the baking qualities and improve the keeping qualities of the yeast), whereupon the yeast is separated and pressed in accordance with the usual commercial practice; (b) the sugar may be washed from the yeast by suspending in water, separating, and pressing, and repeating the process until the yeast is substantially free from the solute. This is usually accomplished by the end of the 2nd pressing.

Example II.

The treatment may be carried on as in Example I, using however, a much smaller ratio of solute to yeast, as for example, about 20 pounds of sodium chloride to 500 pounds of compressed yeast. The mass is mixed intimately and allowed to stand at room temperature for 1 hour or less, whereupon the excess of salt is washed from the yeast in accordance with the method outlined in division b of Example I.

Since certain changes may be made in the above product and different embodiments of the invention could be made without departing from the scope thereof, it is intended that all matter contained in the above description shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. A method of treating yeast which comprises subjecting the yeast to the action of a solute in the presence of moisture under such conditions of time, temperature and concentration that autolysis and fermentative activity are substantially avoided, and thereafter removing the excess of solute from the yeast.

2. A method of modifying the flavor of yeast without materially lowering its baking strength, which comprises subjecting the yeast to the action of a solute in the presence of moisture for a time such that the flavor is modified substantially, and under such conditions of temperature and concentration that autolysis and fermentative activity are substantially avoided and its baking strength is substantially maintained, and thereafter removing the excess of solute from the yeast.

3. A method of modifying the flavor of yeast without materially lowering its baking strength, which comprises subjecting compressed yeast to the action of a solute for a time such that the flavor is modified substantially, and under such conditions of temperature and concentration that autolysis and fermentative activity are substantially avoided and its baking strength is substantially maintained, thereafter removing the excess of solute from the yeast, and again pressing off the yeast.

4. A method of modifying the flavor of yeast which comprises subjecting the yeast to the action of a sugar material in the presence of moisture for a time such that the flavor is modified substantially, and under such conditions of temperature and concentration that autolysis and fermentative activity are substantially avoided and its baking strength is substantially maintained, and thereafter removing the excess sugar material.

5. A method of modifying the flavor of yeast without materially lowering its baking strength, which comprises mixing compressed yeast with a sugar material in such amounts that the sugar comprises about 33% of the mass, and maintaining the mass at about room temperature for a time such that the flavor is modified substantially, but autolysis is substantially avoided and its baking strength is substantially maintained and thereafter removing the excess of the sugar from the yeast.

6. A method of modifying the flavor of yeast without materially lowering its baking strength, which comprises mixing compressed yeast with a sugar material in such amounts that the sugar comprises about 33% of the mass, and maintaining the mass at about room temperature for a time such that the flavor is modified substantially, but autolysis is substantially avoided and its baking strength is substantially maintained and thereafter removing the excess of the sugar from the yeast by washing and pressing the mass.

7. A method of modifying the flavor of yeast without materially lowering its baking strength, which comprises mixing compressed yeast with a sugar material in such amounts that the sugar comprises about 33% of the mass, and maintaining the mass at about room temperature for a time such that the flavor is modified substantially, but autolysis is substantially avoided and its baking strength is substantially maintained and thereafter removing the excess of the sugar from the yeast by washing and pressing the mass and fermenting out the residual sugar material.

8. A compressed yeast product having good baking strength and keeping qualities, the flavor of which has been modified by treating the yeast with a solute under such conditions of time, temperature and concentration that autolysis and fermentative activity are substantially avoided and from which the excess of the solute has been removed.

9. A compressed yeast product having good baking strength and keeping qualities, the flavor of which has been modified by treating the yeast with a sugar material under such conditions of time, temperature and concentration that autolysis and fermentative activity are substantially avoided and from which the excess of the sugar material has been removed.

In testimony whereof I affix my signature.

ELMER B. BROWN.